United States Patent [19]

McGibbon et al.

[11] Patent Number: 4,768,807

[45] Date of Patent: Sep. 6, 1988

[54] WHEEL SUSPENSION

[75] Inventors: Avelaino McGibbon, Flint; Richard C. Jaxtheimer, Utica, both of Mich.

[73] Assignee: General Motors Corporation, Detroit, Mich.

[21] Appl. No.: 66,324

[22] Filed: Jun. 25, 1987

[51] Int. Cl.$^4$ .................. B60G 11/08; B60G 11/12
[52] U.S. Cl. .................... 280/719; 267/269
[58] Field of Search ............. 280/719, 718; 267/260, 267/263, 269, 270, 192

[56] References Cited

U.S. PATENT DOCUMENTS

| | | |
|---|---|---|
| 2,460,106 | 1/1949 | Rowland ........................... 280/719 |
| 2,697,613 | 12/1954 | Glacosa ........................... 280/719 |
| 4,422,666 | 12/1983 | Proctor ............................ 280/719 |
| 4,557,500 | 12/1985 | Collard ............................ 280/719 |

FOREIGN PATENT DOCUMENTS

| | | | |
|---|---|---|---|
| 2927486 | 1/1981 | Fed. Rep. of Germany ...... 280/719 |
| 157847 | 7/1986 | Japan ................................. 267/260 |
| 02316 | 4/1987 | PCT Int'l Appl. ................ 280/719 |

Primary Examiner—John J. Love
Assistant Examiner—Karin L. Ferriter
Attorney, Agent, or Firm—R. L. Phillips

[57] ABSTRACT

A motor vehicle wheel suspension has a composite leaf spring arranged transversely supporting a wheel support. A pivot retainer and tuneable rubber bushing arrangement supports the spring on the vehicle frame so that the spring is positively retained thereon while elastically supported with a tuneable fore/aft, vertical and lateral compliance and while also being pivotal about an axis intersecting at right angles with the neutral shear plane of the spring.

1 Claim, 1 Drawing Sheet

WHEEL SUSPENSION

TECHNICAL FIELD

This invention relates to wheel suspensions and more particularly to motor vehicle wheel suspensions using a transverse composite leaf spring as also a suspension control arm.

BACKGROUND OF THE INVENTION

Composite leaf springs such as the fiberglass Liteflex ® springs manufactured by the Inland Division of General Motors Corporation offer both mass and space savings over conventional coil and metal leaf spring designs used in vehicle suspension systems. One particularly attractive design is to employ a transverse composite leaf spring that serves as a suspension control arm as well as a spring. In providing for such usage, there are various criteria that need to be considered. For example, the attachment device for such a transversely arranged leaf spring needs to prevent excessive lateral translation of the spring at the attachment point to the cross frame. Furthermore, it is desirable that the composite leaf spring be supported so as to allow it to pivot with minimum local stresses in the spring. It is also desirable that the suspension loads be isolated from the composite spring to the vehicle structure. In addition, the spring should remain durable over its expected life and provide consistent predictable function that is insensitive to environment changes such as temperature, mud, humidity, salt and so forth.

In the attachment devices to date, there is generally employed thick rubber isolators bonded to the opposite sides of the composite spring with a C-clamp retainer then compressing the isolator sandwiched spring and bolting same to the frame. While such devices have proven generally satisfactory, it has been found that the bonded rubber isolators and compressive load can restrict the pivot action of the leaf spring through the attachment thereby adding local stresses to the spring. Furthermore, the isolation of the suspension loads from the vehicle structure is dependent on the compressive force and properties of the isolators in the C-clamp retainer. Moreover, translation of the composite spring is dependent on the compressive force and the material bonding the rubber isolators to the spring surface. As a result, deterioration of the bonding material because of changing environment or pivot motion of the spring through the assembly can allow unwanted lateral translation of the spring.

SUMMARY OF THE INVENTION

An object of the present invention is to more efficiently allow the composite leaf spring to pivot through its frame attachment and to minimize the local stress that can occur in the spring.

Another object is to provide improved lateral support to restrain translation of the composite spring particularly when used as an integral suspension control arm.

Another object is to provide consistent predictable function which is insensitive to changing environments.

Still another object is to aid development tuning of the composite spring for specific vehicle programs by allowing load versus deflection, suspension isolation and durability to be established by a readily tuneable device.

This is accomplished according to the present invention with a pivot retainer assembly and a tuneable bushing arrangement that cooperatively mount the spring on the vehicle frame so that the spring is positively retained on the frame while elastically supported with a tuneable fore/aft, vertical and lateral compliance and while also being pivotable about an axis substantially intersecting at right angles with the neutral axis of the spring.

These structural features as well as other objects, advantages of the present invention will become more apparent from the following detailed description of the preferred embodiment illustrated in the accompanying drawings in which.

Figure 1:
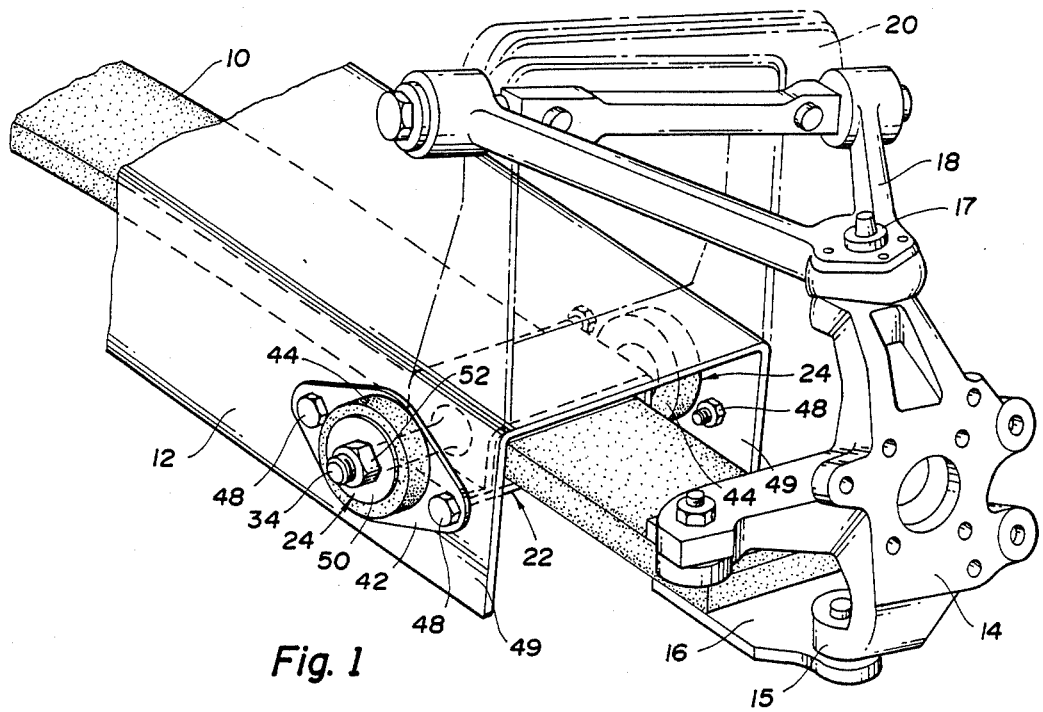
FIG. 1 is an isometric view of a motor vehicle front wheel suspension.
Figure 2:
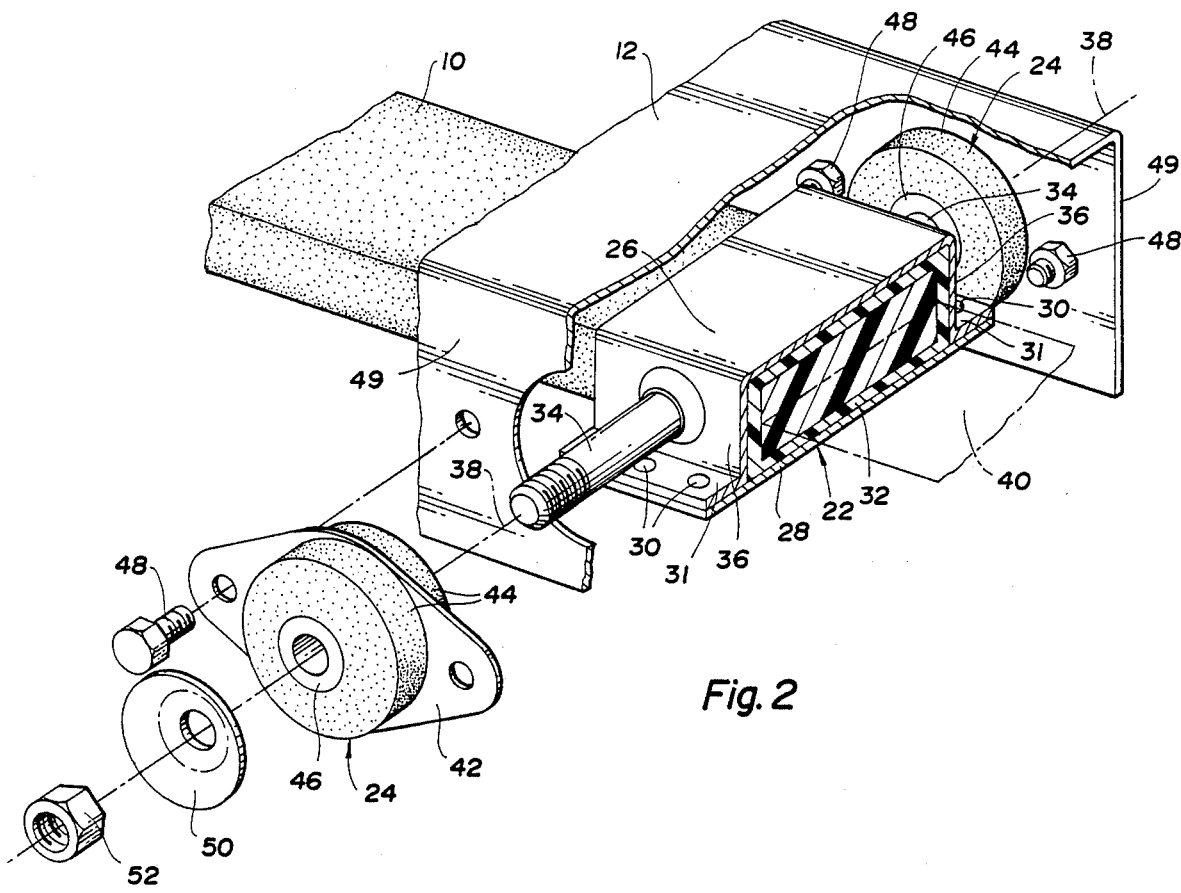
FIG. 2 is an enlarged view of the pivot retainer and tuneable bushing arrangement in FIG. 1 with some parts broken away and some parts shown exploded.

Referring to FIG. 1, the motor vehicle front wheel suspension thereshown comprises a composite leaf spring 10 that is arranged transversely of the vehicle frame beneath a cross member 12 thereof and supports at each of its outboard ends the lower end of a front wheel knuckle 14. The knuckle 14 is connected by a ball joint 15 to a plate 16 bolted to the end of the spring and at its upper end is connected by a ball joint 17 to an upper A-arm 18 that is pivotally connected to a suspension hangar 20 on the vehicle frame. To serve as two lower control arms in this type of suspension, the composite spring 10 is pivotally mounted on the frame at two points spaced along the spring length and this is accomplished according to the present invention at each such pivot point with a pivot retainer assembly 22 and two tuneable rubber bushing arrangements 24 (only one such installation being shown).

The pivot retainer assembly 22 comprises an upper hat-shaped retainer member 26 extending over the top and down the sides of the spring and a lower flat-shaped retainer member 28 that extends under the bottom of the spring and is fixed at its opposite ends by rivets 30 to the horizontal ends 31 of the upper member. The retainer members 26 and 28 physically surround and thus capture the spring and a thin rubber sleeve 32 referred to as an isolator is cement bonded between the retainer members and the spring to prevent chafing of the latter. As a result, high compression loads as well as secure bonding cement minimizes translation of the pivot retainer assembly with the composite spring. Two pivot studs 34 press-fitted and welded to the vertical sides 36 of the upper retainer member extend in opposite directions therefrom and are axially aligned and arranged so that they establish a pivot axis 38 at right angles to the length of the spring and contained within neutral shear plane 40 of the latter.

The composite spring with the pivot retainer assembly is secured to the cross member 12 of the vehicle frame with the two tuneable rubber bushing arrangements 24. The bushing arrangements each comprise an attaching plate 42 which supports a pair of rubber bushings 44 on opposite sides thereof having a metal bushing 46 extending therethrough. The attaching plates 42 of the respective bushing arrangements are secured by bolts 48 to the outboard sides 49 of the channel-shaped cross member 12 with the pivot studs received in the respective metal bushings 46. A cup-shaped washer 50 which will be referred to as a rate cup because of its function is received on each pivot stud and is held against the respective metal bushing 46 with a nut 52 which threads onto the end of the respective pivot stud. The rate cup is opposite the respective rubber bushings and its configuration through contact with the outboard side of these bushings affects their fore/aft, vertical and lateral compliance and thus that of the spring. By using interchangeable rate cups of various configuration it is thus possible to vary or fine tune these rates to those desired. Thus, the tuneable rubber pivot stud bushing mounts help minimize design changes of the composite spring in order to establish the necessary function/character in a specific vehicle program. Furthermore, it will be appreciated that the fore/aft, vertical and lateral compliances may be tuned independently using the tuneable bushings.

The above described preferred embodiment is illustrative of the invention which may be modified within the scope of the appended claims.

The embodiments of the invention in which an exclusive property or privilege is claimed are defined as follows:

1. In a wheel suspension suspending a wheel on a frame of a motor vehicle, a composite leaf spring arranged transversely of said frame, means for supporting said wheel on one end of said spring, and pivot means and elastomeric bushing means for cooperatively mounting said spring on said frame at a location inboard of said one end so that said spring is positively retained on said frame while elastically supported with a predetermined fore/aft, vertical and lateral compliance and while also being pivotal about an axis at right angles to the length of said spring and contained within the neutral shear plane of said spring, said pivot retainer means comprising rigid retainer means surrounding said spring, a rubber sleeve bonded between said rigid retainer means and said spring, a pair of pivot studs fixed to and extending in opposite directions from said rigid retainer means, said pivot studs having axes that are axially aligned and at right angles to the length of said spring and contained within the neutral shear plane of said spring, said elastomeric bushing means comprising a pair of elastomeric bushing assemblies mounted on said frame and receiving said pivot studs.

* * * * *